United States Patent [19]

Wilson

[11] 4,058,427

[45] Nov. 15, 1977

[54] PIPE WRAPPING APPARATUS

[75] Inventor: Daniel F. Wilson, Houston, Tex.

[73] Assignee: Midcon Pipeline Equipment Co., Houston, Tex.

[21] Appl. No.: 755,261

[22] Filed: Dec. 29, 1976

[51] Int. Cl.² ................ B65H 81/00; B32B 31/00
[52] U.S. Cl. ................................ 156/392; 156/584
[58] Field of Search ............ 156/391, 392, 425, 584

[56] References Cited

U.S. PATENT DOCUMENTS

| 1,973,505 | 9/1934 | Rolfs et al. | 156/392 |
| 3,547,731 | 12/1970 | Stuart, Jr. et al. | 156/392 |
| 4,008,114 | 2/1977 | Lindsey | 156/392 |

Primary Examiner—Douglas J. Drummond
Attorney, Agent, or Firm—Carl B. Fox, Jr.

[57] ABSTRACT

Pipe wrapping apparatus, having one or more pipe wrapping tape spindles with each of which is associated a take up spindle onto which tape backing is wound after the backing has been stripped from the tape as the tape is wound onto the pipe.

14 Claims, 6 Drawing Figures

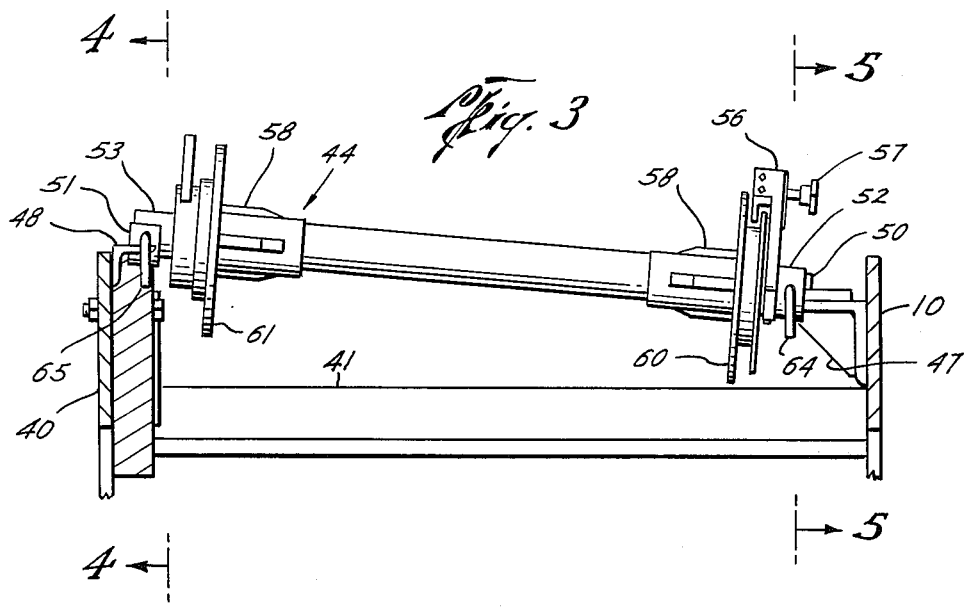
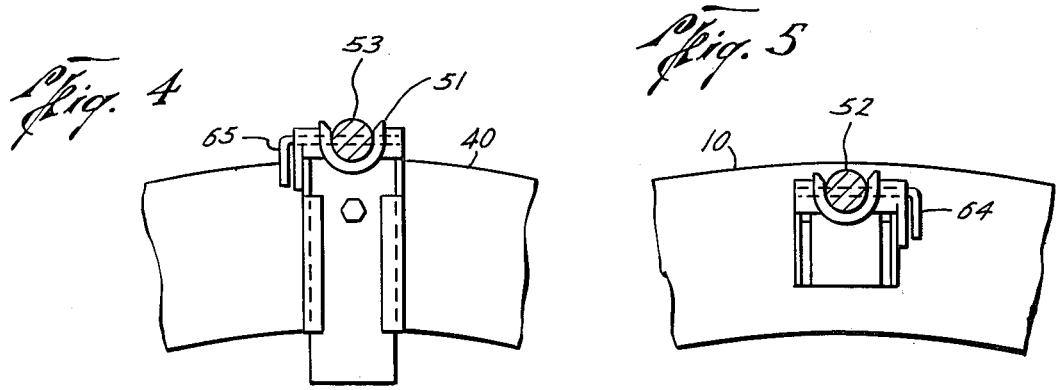
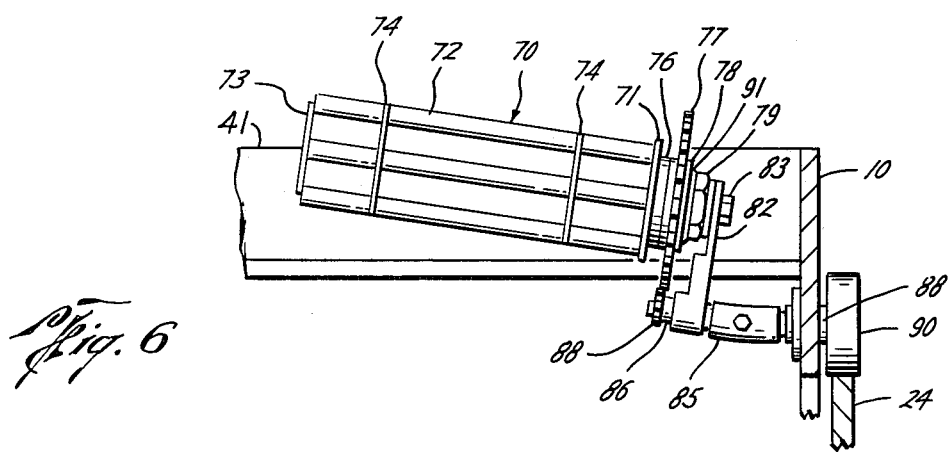

PIPE WRAPPING APPARATUS

BACKGROUND OF THE INVENTION

Pipe making up pipelines is frequently wrapped with tapes of various kinds which serve to protect the pipe from corrosion and other chemical effects of soil, moisture, and weather, and the like. Many pipe wrapping tapes have an adhesive applied to one side and are of a self-adhesive character, so that a backing strip or tape must be used to cover the sticky side of the pipe wrapping tape in order that it can be supplied in roll form and can be readily unwound from the roll. Peeling the backing strip from the tape and disposal of the backing strip after it has been peeled from the tape along the pipeline right of way has been a problem, and is usually accomplished by manually pulling the backing from the tape as the tape is unwound onto the pipe from a roll of tape supported by a spindle on the pipe wrapping machine, and then periodically cutting or tearing off lengths of the backing collected in wads and throwing it aside along the pipeline right of way. The discarded backing must then be picked up for disposal, and it frequently happens that it is left to litter and clutter the pipeline right of way.

SUMMARY OF THE INVENTION

The invention provides a pipe wrapping apparatus wherein a spindle is provided to take up the backing peeled from the pipe wrapping tape just as the tape is drawn from the roll and before the tape is wrapped about the pipe. The backing take up spindle is supported by the pipe wrapping machine adjacent the wrapping tape spindle, at the side of the tape on which the backing is disposed.

The tape and backing take up spindles are supported on a ring structure which is driven in rotation about the pipe as the wrapping machine travels along the pipe. The tape is guided by guide rollers to be wrapped helically around the pipe as the ring structure is rotated about the pipe and the wrapping machine is advanced along the pipe.

Tape may be wound onto the pipe from a single tape roll or from plural tape rolls suitably circularly spaced around the ring structure, and each preferably provided with a backing take up spindle as herein described.

A principal object of the invention is to provide an improved pipe wrapping apparatus. Another object of the invention is to provide such apparatus wherein one or more tape rolls are supported on rotative spindles and wherein a spindle is provided for each tape roll to receive backing stripped from one side of the tape as the tape travels from the roll to be wound onto a pipe. A further object of the invention is to provide such apparatus which is dependable and efficient in use, and which is relatively simple in structure and is economical.

Other object and advantages of the invention will appear from the following detailed description of a preferred embodiment of apparatus according to the invention, and from the accompanying drawings which are referred to in the description.

BRIEF DESCRIPTIONS OF THE DRAWINGS

FIG. 3 is an enlarged side elevation of the tape roll spindle of the apparatus and the supports therefor.

Figures 1, 2:
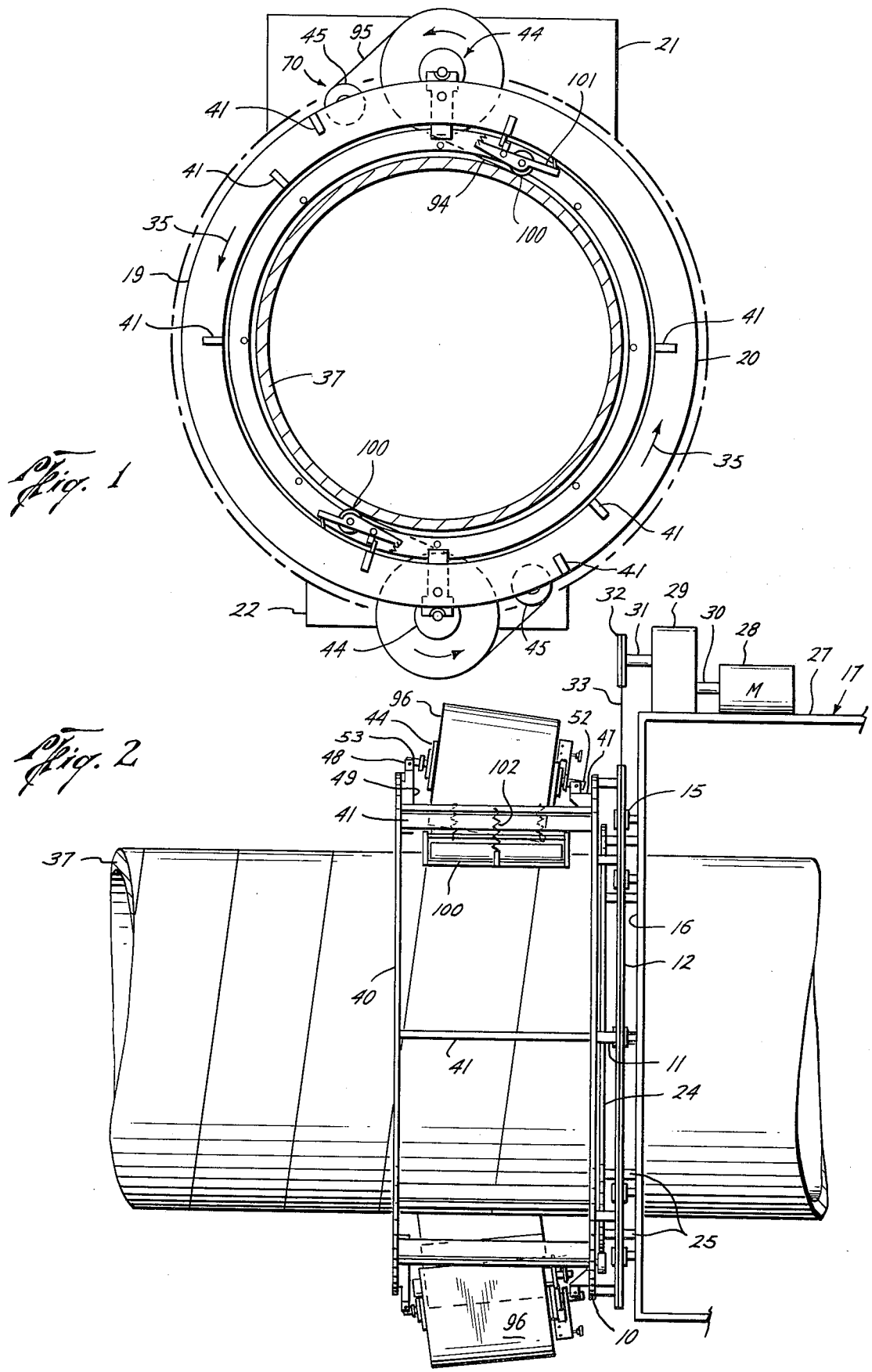
FIG. 1 is an end elevation of a preferred embodiment of apparatus according to the invention.
FIG. 2 is a side elevation of the apparatus shown in FIG. 1.

FIGS. 4 and 5 are cross sections taken at lines 4—4 and 5—5, respectively, of FIG. 3.

FIG. 6 is an enlarged side elevation of the backing take up spindle of the apparatus and the supports therefor.

DESCRIPTION OF THE PREFERRED EMBODIMENT

Describing the preferred embodiment of apparatus according to the invention, and referring first to FIGS. 1 and 2 of the drawings, a rotatable circular support ring 10 is supported by a plurality of circularly spaced parallel tubular connectors 11, the opposite ends of the connectors 11 being connected to a circular sprocket ring 12. Sprocket ring 12 is supported by a suitable plurality, eight being shown, of peripherally grooved rollers 15, the inner periphery of sprocket ring 12 being fitted within the roller grooves. Rollers 15 are supported by a plate 16 at the end of the pipe wrapping apparatus frame 17, only a portion of the frame being shown in the drawings. Plate 16 is of circular shape at its opposite sides 19, 20 and has rectangular projections 21, 22 at its top and bottom, respectively. The wrapping machine frame 17 is shown schematically, and some necessary parts with respect to its functions are omitted from the drawings.

A circular ring 24 is concentrically supported by plural circularly spaced tubular connectors 25 the opposite ends of which are connected to plate 16 of frame 17.

Top plate 27 of frame 17 supports drive motor 28 and gearbox 29, shaft 30 of motor 28 being connected to the gear train within gear box 29, and shaft 31 of gearbox 29 carries a chain sprocket 32. A chain 33 is disposed around sprocket 33 and sprocket ring 12, and operation of motor 28 thereby causes rotation of sprocket ring 12 and support ring 10. The direction of rotation is indicated by arrows 35 in FIG. 1.

Frame 17 is open through its center whereby the frame may be placed around a pipe 37 to be wrapped. The pipe extends through rings 10, 12 and 24 and through a suitable opening (not shown) through plate 16. Frame 17 is equipped with suitable support wheels driven by suitable drive means (not shown) so that frame 17 may be moved along the pipe as wrapping of tape onto the pipe exterior proceeds. These elements may be of any form known in the art suitable for their purposes, and further description thereof is not necessary to an understanding of the invention.

A circular concentric ring 40 is supported by ring 10 by plural tubular connectors 41 of rectangular cross section extending between the two rings. Ring 40 is of the same size as ring 10, and the two rings 10 and 40 and the connectors extending therebetween together with ring sprocket 12 and connectors 11 form a rotative frame which carries the tape spindles 44 and the backing tape take up spindles 45.

Referring now also to FIGS. 3-5, the spindles 44, two being shown but any suitable number of which may be provided, are each supported by a bracket 47 mounted on ring 10 and a bracket 48 mounted on ring 40. A block 49 is affixed to ring 40 radially inward of each bracket 48. The brackets 47, 48 each have half cylindrically shaped elements 50, 51 facing outwardly to receive the end shafts 52, 53, respectively, of the spindles 44. A disc brake 56 having adjustment wheel 57 is provided at the forward end of the spindle to control tension in the wrapping tape as it is pulled from a tape roll carried by the spindle. Centering ribs 58 are provided at each end of each spindle to center the tape roll core (not shown) placed thereon between circular end plates 60, 61. The spindles 44 are rotated by the tension of the tape drawn therefrom, and are restrained by a brake 56 to control the tape tension.

The spindle end shafts 52, 53 are retained in elements 50, 51, respectively, by L-shaped pins 64, 65 removably received in aligned holes of elements 50, 51 and shafts 52, 53, the pins being removed to permit installation and removal of the spindle. One end assembly of the spindle is removable to permit placement of the tape rolls on the spindle. Since the spindles are conventional in design, further explanation is not necessary, and further details may be obtained from commercial apparatus and from the prior art.

Backing take up spindles 70, one of which is shown in FIG. 6, each has a spindle frame formed by a circular end plate 71, parallel circularly spaced rods 72, end plate 73, and surrounding wire rings 74. A tube of square cross section (not shown) is disposed inside of rods 72, and wire rings 74 are positioned with the corners of their square shapes 45° from the corners of the tube rotationally with one rod 72 against each side of the squared tube and inside the corner of the wire ring 74 at each end of the assembly. The rods 72 act as roller cams to tighten the assembly by rolling away from the wire ring corners. This structure is known in the art and further description is not necessary.

A threaded shaft (not shown) depends concentrically from plane 71 and extends through spacer elements 76, gear 77, and clutch 78, and has nut 79 screwed thereon to retain these elements. Bracket 82 is engaged around the end of the shaft and is retained in fixed position by nut 83 screwed onto the end of the shaft. Support arm 85 supports bracket 82 and has an internal rotative multipart shaft 86, 87 which drives gear 88 which is engaged with gear 77. Shaft elements 86, 87 are driven in rotation by wheel 90 carried on shaft element 88, which is rotated by frictional engagement with stationary plate 24, this causing rotation of the backing take up spindle 70. Clutch 78 permits the take up spindle to slip according to the rate the backing is rolled thereonto.

The pipe wrapping tape 94 has backing strip 95 removably adhered to its adhesive side, a roll 96 of the tape being installed on each spindle 44. The end of the backing is pulled from the wrapping tape and affixed to the take up spindle 70. As the ring 10, 40 assembly rotates, the take up spindles 70 are rotated by engagement of wheels 90 with ring 24, and the backing 95 is wound continuously onto the spindles 70 as the wrapping tape is unwound from the rolls.

The wrapping tape, freed of the backing, passes beneath pressure roller 100, a pressure roller 100 being provided for each spindle pair, carried by a frame 101 urged by springs 102 into pressured engagement against the outer surface of the wrapping tape to press the wrapping tape against the pipe surface to adhere the tape to the pipe and to the overlapped course of tape already on the pipe. The wrapping tape is caused to wrap helically onto the pipe without wrinkling by the angular dispositions of the tape spindles 44. The angular dispositions of take up spindles 70 results in smooth wrapping of the backing thereonto. As has been described, the wrapping machine is propelled along the pipe as wrapping proceeds, and operation of motor 28 causes rotation of sprocket 12 and rings 10, 40 to cause the wrapping tape to be wrapped onto the pipe 37.

A principal advantage of the apparatus is that the tape spindles 44 are supported at both of their ends so that the spindles are not free to flex as the wrapping head rotates about the pipe. This insures wrinkle-free application of the tape, felt, glass, paper or other wrapping material which is being wrapped onto the pipe. In conventional pipe wrapping apparatuses the tape spindles are cantilevered and are thus free to flex at least to some extent so that the angles of the spindles with respect to the pipe are changed, which results in wrinkling of the material being wrapped onto the pipe. This cannot occur in the case of the apparatus herein disclosed since both ends of each tape spindle is firmly supported by the ring supports 10 and 40.

As will be evident, the backing tape is wound onto spindles 70 in a controlled continuous manner, so that it will not be randomly strewn along the pipeline right of way to be an eyesore and a nuisance. The cost of later picking up the waste material is also saved, thereby making the wrapping job somewhat more economical. When the tape spindle is full, the rolled up backing is removed and formation of another roll of the backing material is commenced. The cost of personnel for pulling the tape free of the backing as wrapping proceeds is eliminated.

While a preferred embodiment of apparatus according to the invention has been described and shown in the drawings, many modifications thereof may be made by a person skilled in the art without departing from the spirit of the invention, and it is intended to protect by Letters Patent all forms of the invention which fall within the scope of the following claims.

I claim:

1. Pipe wrapping apparatus, comprising first spindle means adapted to hold a roll of pipe wrapping tape having a strip of backing material removably adhered to one surface thereof, means for supporting said first spindle means adjacent a pipe receiving path provided through said pipe wrapping apparatus, means for moving said supporting means and said first spindle means about a pipe disposed along said path to draw said tape from said roll to be wound around said pipe, second spindle means supported by said supporting means adjacent said first spindle means, means for rotating said second spindle means about its axis whereby said backing strip may be wound thereon and removed from said pipe wrapping tape before said pipe wrapping tape is wound around said pipe.

2. The combination of claim 1, wherein said backing strip is disposed on the side of said wrapping tape toward the outside of said roll.

3. The combination of claim 1, including pressure roller means for pressing said tape against the outer surface of the pipe, said pressure roller means being supported by said supporting means adjacent a pipe in said path and being supported by a frame spring biased toward said pipe.

4. The combination of claim 1, said supporting means comprising a circular ring sprocket rotatably supported by plural circularly spaced rollers engaging its inner periphery and depending from the main frame of the wrapping machine, and comprising circular ring means depending from said ring sprocket and rotatable therewith having said first and second spindle means carried thereby; fixed ring means depending from said main frame disposed concentrically adjacent said circular ring means, said second spindle means being rotated about its own axis by wheel means frictionally engaging said fixed ring means.

5. The combination of claim 4, said rotatable ring means comprising a pair of axially spaced rings, said first spindle means being connected between said pair of axially spaced rings and said second spindle means being connected to one of said pair of axially spaced rings, whereby said first spindle means is supported at both of its ends and is not subject to flexure and change of position so that wrinkling of the tape caused by such flexure is eliminated.

6. The combination of claim 5, said first spindle means including brake means to control the tension of the wrapping tape passing from said roll onto said pipe, said second spindle means including clutch means to control the tension of said backing strip pulled from said wrapping tape and wound thereonto.

7. Pipe wrapping apparatus comprising an apparatus frame having a pipe passage therethrough and including means for propelling the apparatus frame along the length of a pipe disposed through said pipe passage, plural circularly spaced rollers depending from one end of said apparatus frame around said pipe passage, a ring sprocket disposed around said rollers to be supported thereby, a ring frame carried by said ring sprocket and rotatable therewith around said pipe passage, drive means carried by said apparatus frame having a drive sprocket aligned with said ring sprocket, a drive chain engaged around said drive and ring sprockets for driving said ring frame in rotation, at least one pipe wrapping tape spindle mounted on said ring frame to be moved around said pipe passage thereby, and a backing take up spindle mounted on said ring frame associated with each said pipe wrapping tape spindle for receiving a backing strip pulled from wrapping tape carried in a roll on said pipe wrapping tape spindle as the wrapping tape is pulled from the roll to be wrapped onto a pipe stationarily disposed through said pipe passage as said ring frame and spindles are rotated about the pipe.

8. The combination of claim 7, said ring frame comprising a pair of axially spaced rings, each said pipe wrapping tape spindle having one end connected to one of said axially spaced rings and its other end connected to the other of said axially spaced rings whereby each said pipe wrapping tape spindle is supported against change of angular position during wrapping so that wrinkling of the tape caused by such angular change of position will not occur.

9. The combination of claim 8, said backing take up spindle being mounted on one of said axially spaced rings.

10. The combination of claim 7, including a stationary ring carried by said apparatus frame adjacent said ring frame, said backing take up spindle having wheel means engaging the periphery of said stationary ring to rotate said backing take up spindle as said ring frame and spindles are rotated around said pipe passage and a said pipe disposed therethrough.

11. The combination of claim 10, said ring frame comprising a pair of axially spaced rings, each said pipe wrapping tape spindle having one end connected to one of said axially spaced rings and its other end connected to the other of said axially spaced rings whereby each said pipe wrapping tape spindle is supported against change of angular position during wrapping so that wrinkling of the tape caused by such angular change of position will not occur.

12. The combination of claim 11, said backing take up spindle being mounted on one of said axially spaced rings.

13. The combination of claim 12, each said pipe wrapping tape spindle having brake means to control the tension of the wrapping tape drawn therefrom onto the pipe, and each said backing take up spindle having clutch means to control the tension of the backing strip wound thereon.

14. The combination of claim 13, including spring biased pressure roller means for pressing the wrapping tape drawn from said roll thereof against the outer surface of the pipe.

* * * * *